United States Patent [19]

Howard

[11] Patent Number: 4,819,801
[45] Date of Patent: Apr. 11, 1989

[54] STORAGE CASE

[75] Inventor: William A. Howard, Barrington, N.H.

[73] Assignee: Savoy Leather Manufacturing Corporation, Haverhill, Mass.

[21] Appl. No.: 141,720

[22] Filed: Jan. 11, 1988

[51] Int. Cl.[4] .......................................... B65D 85/672
[52] U.S. Cl. .................................. 206/387; 206/449; 206/564; 312/8; 211/40
[58] Field of Search ............... 206/387, 564, 561, 449, 206/454; 217/7, 10, 11, 36, 42; 312/8, 9, 118; 211/40, 42

[56]  References Cited

U.S. PATENT DOCUMENTS

| 1,319,410 | 10/1919 | Morton | 217/36 |
| 1,833,081 | 11/1931 | Kilmer | 217/36 |
| 1,932,294 | 10/1933 | Stuart | 217/36 |
| 3,674,132 | 7/1972 | Loss | 206/387 |
| 3,756,383 | 9/1973 | Kryter | 206/387 |
| 3,856,369 | 12/1974 | Commiant | 206/387 |
| 3,907,116 | 9/1975 | Wolf et al. | 211/40 |
| 4,040,518 | 8/1977 | Carter | 206/564 |
| 4,251,006 | 2/1981 | Smith | 217/36 |
| 4,293,075 | 10/1981 | Veralrud | 206/387 |
| 4,375,850 | 3/1983 | Smyth et al. | 206/387 |
| 4,577,914 | 3/1986 | Stravitz | 206/387 |
| 4,595,098 | 6/1986 | Kryter | 312/9 |
| 4,707,247 | 11/1987 | Savoy | 206/387 |

Primary Examiner—David T. Fidei
Attorney, Agent, or Firm—Charles Hieken

[57] ABSTRACT

A storage case for storing electronic recording devices and their boxes. The case has a base, two end walls and two side walls, each fixedly connected together to form an open box. The side walls have an upper and a lower portion, the lower portion being adjacent the base and the upper portion being located between the base and the open end of the box. The upper portion, but not the lower portion of the box, comprises a plurality of paired vertical ribs spaced to allow an electronic recording device or a box to be inserted through the ribs and held in a vertical position in the case.

4 Claims, 1 Drawing Sheet

STORAGE CASE

BACKGROUND OF THE INVENTION

This invention concerns containers for storing electronic recording devices, including cassette tapes, videocassettes and compact discs.

SUMMARY OF THE INVENTION

The invention features a storage case for storing electronic recording devices and their boxes. The case has a base, two end walls and two side walls, each fixedly connected together to form an open box. The side walls have an upper and a lower portion, the lower or inside portion being adjacent the base and the upper or outside portion being located between the base and the open end of the box. The upper portion, but not the lower portion of the box, comprises a plurality of paired ribs spaced to allow an electronic recording device or a box to be inserted through the ribs and held in a position in the case generally perpendicular to the base.

This storage case is for storing items having length, width and thickness. The base is formed by a pair of spaced slats secured at each end to respective ones of the end walls and separated from each other. Each of the side walls is formed by an inside slat forming the inside portion and an outside slat having an inside surface opposite the inside surface of the other outside slat forming the outside portion secured at each end to respective ones of the end walls and separated from each other by a gap with the width of each side wall being less than the width of an item stored therein and the separation between the side walls corresponding substantially to the length of an item stored therein. Each of the inside surfaces has a plastic strip formed with the ribs lengthwise-spaced with adjacent ribs separated by a distance corresponding substantially to the stored item thickness for snugly engaging a stored item and allowing easy insertion and removal.

In preferred embodiments, the upper and lower portions are spaced apart; the base is formed from a plurality of strips of wood, the strips being spaced apart; the ribs are formed from a vacuum formed plastic structure having a flock coating; and the devices being stored are chosen from a cassette tape, a video cassette tape, and a compact disc.

This invention provides a storage case, for a variety of electronic recording devices, which is cheap to make and light in construction. These cases can be readily stacked one atop the other and provide easy access to each stored device. Once stacked the cases interlock to form a stable structure. Although the devices can be stacked closely together they can be pushed from the case from the base of the case through slits in this portion. The case is preferably made from a light wood and thus is easy to construct. The compartments, or grooves, for holding each device are provided by a relatively thin single piece of vacuum formed plastic. These features reduce the cost of producing such a case, yet still provide firm storage of the devices.

Other features and advantages of the invention will be apparent from the following description of the preferred embodiment, and from the claims.

DESCRIPTION OF THE PREFERRED EMBODIMENT

The Figures will first briefly be described.

DRAWINGS

Figure 1:
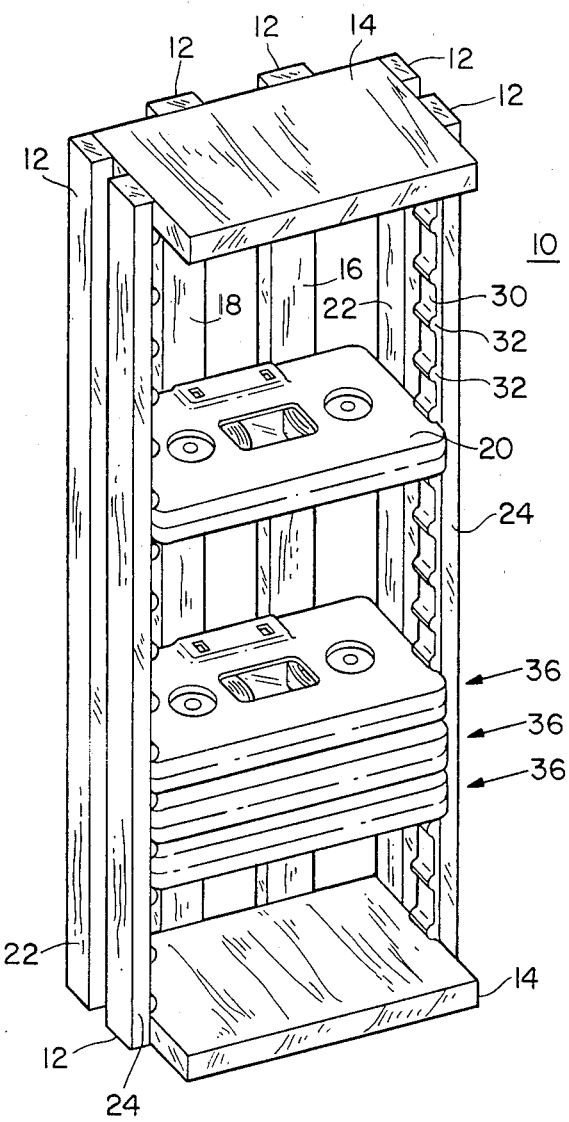
Figure 2:
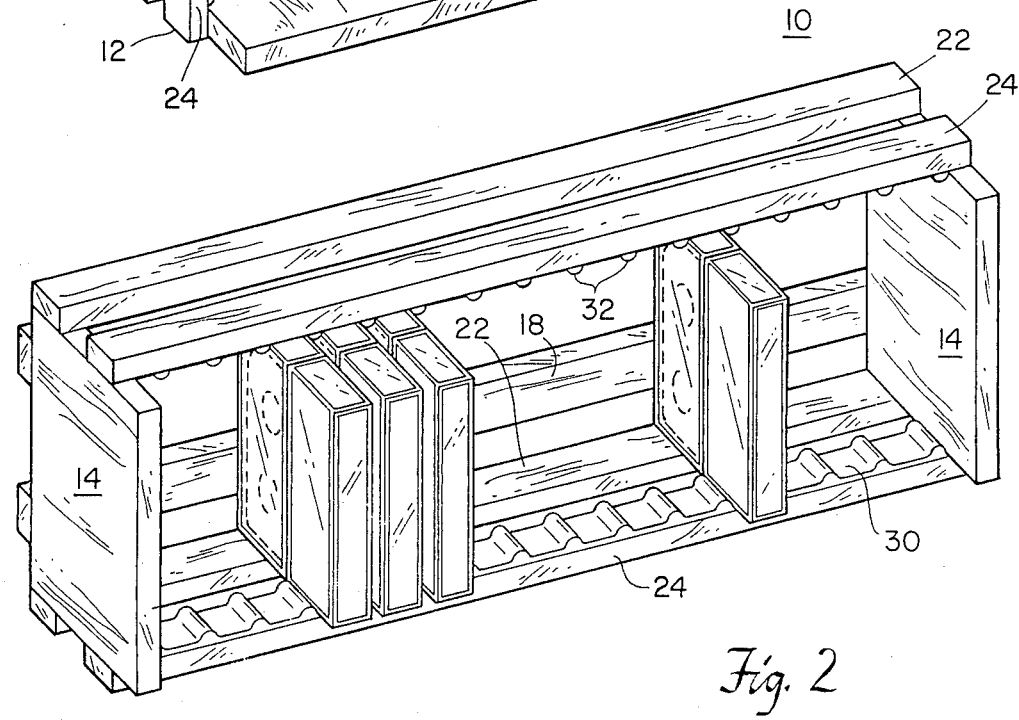

FIGS. 1 and 2 are perspective views of a storage case for cassette tapes and for cassette tape boxes, respectively.

STRUCTURE

Referring to the Figures, case 10 is constructed from wood pieces including six relatively thin slats 12 on the sides and bottom of case 10, and 2 end pieces 14. These pieces are all fixed together with nails, screws, or staples, by standard techniques, to form a generally rectangular container. The size of the box, its length, width and depth are all chosen to be suitable for holding any one of a series of electronic recording devices, such as tape cassettes, compact discs and videocassettes.

The base of case 10 is formed from slats 16, 18 which are spaced apart a distance just greater than the width of device 20, to provide support for the device 20 to be stored. The side walls of case 10 are formed from lower slats 22, and upper slats 24. Lower slats 22 are fixed near to bottom slats 16, 18, and the upper slats are positioned about half way along the length of end pieces 14. End pieces 14 are of a length about equal to the length of device 20 to be stored.

Upper slats 24 are provided with a plastic vacuum formed structure 30 having paired ribs 32 which are located on opposite sides of upper slats 24 to form a groove suitable for holding device 20. Structure 30 is attached to upper slat 24 by adhesive. Paired ribs 32 define grooves 36 and are spaced apart a distance equal to the width of device 20 to be stored.

Lower and upper slats act to allow interlocking of two or more cases. Each case may contain different sized tapes or boxes. The cases may also be stacked end on end for easy and convenient storage.

Other embodiments are within the following claims. For example, any one case may have ribs which accomodate different sized tapes or boxes, much as described in patent application Ser. No. 07/034,402, entitled Disk Cassette Storing.

I claim:

1. A storage case for storing items having length, width and thickness from the group consisting of electronic recording devices and their boxes, comprising:

a base, two end walls and two side walls, each fixedly connected together to form an open box, said side walls comprising an outside and an inside portion, said inside portion being adjacent said base and said outside portion being between said base and the open end of said box, wherein said outside portions, but not said inside portions, comprise a plurality of paired ribs spaced to allow a said item to be inserted through said ribs and held in a position in said case generally perpendicular to said base, said base being formed by a pair of spaced slats secured at each end to respective ones of said end walls and separated from each other, each of said side walls being formed by an inside slat forming said inside portion and an outside slat having an inside surface opposite the inside surface of the other outside slat forming said outside portion secured at each end to respective ones of said end walls and separated from each other by a gap with the width of each side wall being less than the width of an item stored therein and the separation between said side walls corresponding substantially to the length of an item stored therein, each of said inside surfaces having a plastic strip formed with said ribs lengthwise-spaced with adjacent ribs separated by a distance corresponding substantially to the stored item thickness for snugly engaging a stored item and allowing easy insertion and removal.

2. The case of claim 1 wherein said slats are strips of wood.

3. The case of claim 1 wherein said plastic strip is formed from a vacuum formed plastic structure having a flock coating.

4. The case of claim 1 said devices being chosen from a cassette tape, a video cassette tape, and a compact disc.

* * * * *